United States Patent
Dennis, II et al.

(10) Patent No.: US 7,390,399 B2
(45) Date of Patent: Jun. 24, 2008

(54) WATER TREATMENT CONTROL SYSTEMS AND METHODS OF USE

(75) Inventors: Richard Dennis, II, St. Anne, IL (US);
Jeffrey Rhodes, Durango, CO (US);
Edward Thomas, Yardville, NJ (US);
James Marcukaitis, Kankakee, IL (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 484 days.

(21) Appl. No.: 11/018,421

(22) Filed: Dec. 21, 2004

(65) Prior Publication Data

US 2006/0131245 A1     Jun. 22, 2006

(51) Int. Cl.
C02F 1/68    (2006.01)

(52) U.S. Cl. .................. 210/96.1; 210/143; 210/205

(58) Field of Classification Search ............... 210/739, 210/746, 96.1, 103, 105, 143, 205; 700/266, 700/267, 271
See application file for complete search history.

(56) References Cited

U.S. PATENT DOCUMENTS

| | | | |
|---|---|---|---|
| 2,289,589 A | 7/1942 | Pomeroy | |
| 3,351,542 A | 11/1967 | Oldershaw et al. | |
| 3,458,414 A | 7/1969 | Crane et al. | |
| 3,669,857 A | 6/1972 | Kirkham et al. | |
| 3,733,266 A | 5/1973 | Bishop et al. | |
| 3,870,631 A | 3/1975 | Fassell et al. | |
| 4,033,871 A | 7/1977 | Wall | |
| 4,053,403 A | 10/1977 | Bachhofer et al. | |
| 4,056,469 A | 11/1977 | Eichenhofer et al. | |
| 4,087,360 A | 5/1978 | Faust et al. | |
| 4,129,493 A | 12/1978 | Tighe et al. | |
| 4,136,005 A | 1/1979 | Persson et al. | |
| 4,137,166 A | 1/1979 | Heimberger et al. | |
| 4,149,952 A | 4/1979 | Sato et al. | |
| 4,224,154 A | 9/1980 | Steininger | |
| 4,256,552 A | 3/1981 | Sweeney | |
| 4,263,119 A | 4/1981 | Mose et al. | |

(Continued)

FOREIGN PATENT DOCUMENTS

CA     1079423     6/1980

(Continued)

OTHER PUBLICATIONS

U.S. Filter/Stranco, "Strantrol® mg/l 5 Controller," Data Sheet (2004).

(Continued)

*Primary Examiner*—Matthew O Savage

(57) ABSTRACT

The control systems and technique can regulate or control operations of a water treatment system in a primary control mode and, when appropriate, in a secondary or an alternate control mode. The primary control can represent a normal control mode during which the water treatment system is intended to operate. The alternate control mode can represent a second control or mode of operation. The systems can be operated to control or facilitate regulation, monitoring, and performance of one or more operating parameters of one or more water systems between, or to and from, a first mode, a second or alternate mode, and, in some cases, a third or even a fourth control mode. The change in control mode can be triggered by identifying one or more predetermined, preselected, and/or programmed conditions.

8 Claims, 9 Drawing Sheets

U.S. PATENT DOCUMENTS

| | | |
|---|---|---|
| 4,323,092 A | 4/1982 | Zabel |
| 4,340,489 A | 7/1982 | Adams et al. |
| 4,366,064 A | 12/1982 | Mihelic et al. |
| 4,381,240 A | 4/1983 | Russell |
| 4,384,961 A | 5/1983 | Abrams et al. |
| 4,385,973 A | 5/1983 | Reis et al. |
| 4,393,037 A | 7/1983 | Delaney et al. |
| 4,409,074 A | 10/1983 | Iijima et al. |
| 4,432,860 A | 2/1984 | Bachot et al. |
| 4,435,291 A | 3/1984 | Matsko |
| 4,456,512 A | 6/1984 | Bieler et al. |
| 4,496,452 A | 1/1985 | Bianchi |
| 4,508,697 A | 4/1985 | Burrus |
| 4,550,011 A | 10/1985 | McCollum |
| 4,574,037 A | 3/1986 | Samejima et al. |
| 4,599,159 A | 7/1986 | Hilbig |
| 4,627,897 A | 12/1986 | Tetzlaff et al. |
| 4,767,511 A | 8/1988 | Aragon |
| 4,818,412 A | 4/1989 | Conlan |
| 4,952,376 A | 8/1990 | Peterson |
| 4,990,260 A | 2/1991 | Pisani |
| 5,230,822 A | 7/1993 | Kamel et al. |
| 5,302,356 A | 4/1994 | Shadman et al. |
| 5,348,664 A | 9/1994 | Kim et al. |
| 5,348,665 A | 9/1994 | Schultz et al. |
| 5,422,014 A | 6/1995 | Allen et al. |
| 5,470,480 A | 11/1995 | Gray et al. |
| 5,518,629 A | 5/1996 | Perez et al. |
| 5,587,069 A | 12/1996 | Downey, Jr. |
| 5,639,476 A | 6/1997 | Osblack et al. |
| 5,779,912 A | 7/1998 | Gonzalez-Martin et al. |
| 5,985,155 A | 11/1999 | Maitland |
| 6,284,144 B1 | 9/2001 | Itzhak |
| 6,503,464 B1 | 1/2003 | Miki et al. |
| 6,535,795 B1 | 3/2003 | Schroeder et al. |
| 6,716,359 B1 | 4/2004 | Dennis |
| 2004/0112838 A1 | 6/2004 | Martin |

FOREIGN PATENT DOCUMENTS

| | | |
|---|---|---|
| GB | 2 027 004 A | 2/1980 |
| JP | 60202792 A | 10/1985 |

OTHER PUBLICATIONS

U.S. Filter/Wallace & Tiernan, "Multi Function Analysers Depolox® 4," Technical Information, date unknown.

WATER TREATMENT CONTROL SYSTEMS AND METHODS OF USE

BACKGROUND OF THE INVENTION

1. Field of the Invention

The invention relates to water and wastewater treatment systems or facilities, and components thereof, as well as to methods, and acts thereof, of treating water and/or wastewater and, in particular, to controlling and control systems of water and/or wastewater treatment systems or facilities.

2. Description of Related Art

Treatments of water and components and/or systems thereof are disclosed. For example, Pomeroy, in U.S. Pat. No. 2,289,589, discloses the treatment of aqueous liquids with halogens. Oldershaw et al., in U.S. Pat. No. 3,351,542, disclose electrolytic chlorination and pH control of swimming pool water. Crane et al., in U.S. Pat. No. 3,458,414, disclose a swimming pool water conditioner. Kirkham et al., in U.S. Pat. No. 3,669,857, disclose electrolytic chlorination and pH control of water. Bishop et al., in U.S. Pat. No. 3,733,266, disclose waste water purification by breakpoint chlorination and carbon adsorption. Bachhofer et al., in U.S. Pat. No. 4,053,403, disclose a method of treating and degerminating water. Eichenhofer et al., in U.S. Pat. No. 4,056,469, disclose the purification of waste water from hydrazine production. Tighe et al., in U.S. Pat. No. 4,129,493, disclose a swimming pool chlorinator system. Persson et al., in U.S. Pat. No. 4,136,005, disclose an electrolytic chlorinator. Heimberger et al., in U.S. Pat. No. 4,137,166, disclose a process for the purification of waste water containing ammonia and ammonia salts. Sato et al., in U.S. Pat. No. 4,149,952, disclose an electrolytic cell. Sweeney, in U.S. Pat. No. 4,256,552, discloses a chlorine generator. Mose et al., in U.S. Pat. No. 4,263,119, disclose anode elements for monopolar filter press electrolysis cells. Adams et al., in U.S. Pat. No. 4,340,489, disclose a wastewater treatment process with pH adjustment. Mihelic et al., in U.S. Pat. No. 4,366,064, disclose treatment of blast furnace wastewater. Reis et al., in U.S. Pat. No. 4,385,973, disclose a process for disinfecting water. Delaney et al., in U.S. Pat. No. 4,393,037, disclose a method for reconditioning bacteria-contaminated hydrogen sulfide removing systems. Iijima et al., in U.S. Pat. No. 4,409,074, disclose a process for electrolysis of an aqueous alkali metal chloride solution. Bachot et al., in U.S. Pat. No. 4,432,860, disclose a porous diaphragm for electrolytic cells. Bianchi, in U.S. Pat. No. 4,496,452, discloses an apparatus and process for producing chlorine gas and for employing such chlorine gas for the production of chlorine water. Burrus, in U.S. Pat. No. 4,508,697, discloses hypochlorite destruction using urea. McCollum, in U.S. Pat. No. 4,550,011, discloses a sample flow cell for automatic halogen and pH control for water reservoirs. Samejima et al., in U.S. Pat. No. 4,574,037, disclose a vertical type electrolytic cell and electrolytic process using the same. Hilbig, in U.S. Pat. No. 4,599,159, discloses an electrolytic pool chlorinator having a distribution chamber for filling anode and cathode chambers. Tetzlaff et al., in U.S. Pat. No. 4,627,897, disclose a process for the electrolysis of liquid electrolytes using film flow techniques. Conlan, in U.S. Pat. No. 4,818,412, discloses an apparatus and process for feeding hypochlorite solution. Brouzes et al., in Canadian Patent No. 1079423, disclose a process for treating waste water. Kiyohiko, in Japanese Patent Application Publication No. 60202792, discloses an apparatus for oxidation and reduction treatment. Nakao et al., in U.K. Patent Application Publication No. GB2027004, disclose a method of treating nitrite-containing waste water. Water treatment control systems are also disclosed. For example, Wall, in U.S. Pat. No. 4,033,871, discloses an integrated monitor and control system for continuously monitoring and controlling pH and free halogen in swimming pool water. Steininger, in U.S. Pat. No. 4,224,154, discloses a swimming pool chemical control system. Zabel, in U.S. Pat. No. 4,323,092, discloses an apparatus and process for detecting free chlorine. Russell et al., in U.S. Pat. No. 4,381,240, disclose a swimming pool water conditioning system. Matsko, in U.S. Pat. No. 4,435,291, discloses a breakpoint chlorination control system. Aragon, in U.S. Pat. No. 4,767,511, discloses a chlorination and pH control system. Kim et al., in U.S. Pat. No. 5,348,664, disclose a process for disinfecting water by controlling oxidation/reduction potential.

SUMMARY OF THE INVENTION

In accordance with one or more embodiments, the invention can provide a method of controlling addition of an oxidizing compound to a water treatment system. The method can comprise measuring a value of a process parameter of the water treatment system, generating a first control signal in a first control mode when the value of the process parameter is within a first range, and generating a second control signal in a second control mode when the value of the process parameter is within a second range.

In accordance with one or more embodiments, the invention can provide a method of controlling addition of an oxidizing compound to a water treatment system. The method can comprise specifying a first set point representing a first desired operating condition of the water treatment system, specifying a second set point and a tolerance representing a second desired operating condition of the water treatment system, generating a first input signal corresponding to a first operating parameter of the water treatment system, generating a second input signal corresponding to a second operating parameter of the water treatment system, generating a first output signal based on a difference between the first input signal and the first set point when a difference between the second input signal and the second set point is less than the tolerance, and generating a second output signal based on the first input signal and a second set point when the difference between the second input signal and the second set point is greater than the tolerance.

In accordance with one or more embodiments, the invention can provide a method of controlling addition of a compound to a water treatment system. The method can comprise specifying a primary set point representing an operating condition of the water treatment system; measuring a primary operating parameter and a secondary operating parameter of the water treatment system; generating a first output signal based on the primary operating parameter and the primary set point; identifying an alternate control mode when at least one condition selected from the group consisting of a low first operating parameter, a high first operating parameter, a low second operating parameter, and a high second operating parameter is present; and generating an alternate output signal based on at least one of the primary operating parameter and the secondary operating parameter when the alternate control mode is identified.

In accordance with one or more embodiments, the invention can provide a water treatment system. The water treatment system can comprise an input device disposed to measure an operating parameter of the water treatment system and generate a corresponding input signal; a controller disposed to receive and analyze the input signal and generate a first output signal, in a first control mode, based on a first difference between the input signal and a first set point value and a second output signal, in a second control mode, based on a second difference between the input signal and a second set point value; and an output device disposed to receive the first and second output signals and regulate addition of an agent to the water treatment system.

In accordance with one or more embodiments, the invention can provide a water treatment system comprising a first measurement device disposed to measure a first parameter of the water treatment system and generate a first input signal, a second measurement device disposed to measure a second parameter of the water treatment system and generate a second input signal, a controller disposed to receive and analyze the first input signal and the second input signal and generate a first output signal when a difference between the second input signal and a second set point value is less than a tolerance and generate a second output signal when the difference between the second input signal and the set point value is greater than the tolerance, and an output device disposed to receive at least one of the first and second output signals and regulate addition of an oxidizer to the water treatment system.

In accordance with one or more embodiments, the invention can provide a water treatment system comprising an ORP sensor disposed in the water treatment system; an amperometric sensor disposed in the water treatment system; a means for controlling addition of an oxidizing species to water in the water treatment system in response to a signal from at least one of the ORP sensor and the amperometric sensor; and a means for identifying and controlling addition of the oxidizing species in an alternate control mode in response to a signal from at least one of the ORP sensor and the amperometric sensor when at least one condition selected from the group consisting of a low first operating parameter, a high first operating parameter, a low second operating parameter, and a high second operating parameter is present.

In accordance with one or more embodiments, the invention can provide a computer-readable medium having computer-readable signals stored thereon that define instructions that, as a result of being executed by a computer, instruct the computer to perform a method of controlling addition of an oxidizer compound to a water treatment system comprising acts of generating a first control signal in a first control mode when a value of a process parameter of the water treatment system is within a first range and generating a second control signal in a second control mode when the value of the process parameter is within a second range.

In accordance with one or more embodiments, the invention can provide a computer-readable medium having computer-readable signals stored thereon that define instructions that, as a result of being executed by a computer, instruct the computer to perform a method of controlling addition of an oxidizer compound to a water treatment system comprising acts of receiving a first input signal from a first input device disposed to measure a first operating parameter of the water treatment system, receiving a second input signal from a second input device disposed to measure a second operating parameter of the water treatment system, generating a first output signal based on the first input signal and a first set point when a difference between the second input signal and the second set point value is less than a tolerance, and generating a second output signal based on the first input signal and a second set point when the difference between the second input signal and the second set point value is greater than the tolerance.

Other advantages, novel features, and objects of the invention should become apparent from the following detailed description of the invention when considered in conjunction with any accompanying drawings, which are schematic and not intended to be drawn to scale.

BRIEF DESCRIPTION OF THE DRAWINGS

Preferred, non-limiting embodiments of the invention will be described by way of example with reference to the following, accompanying drawings. In the drawings, each identical or nearly identical component that is illustrated in any of the various drawings may be typically represented by a like numeral. For clarity, not every component may be labeled in every drawing and not every component may be shown where illustration is not necessary to allow a person of ordinary skill in the art to understand the invention. In the drawings.

DETAILED DESCRIPTION OF THE INVENTION

Figure 1:
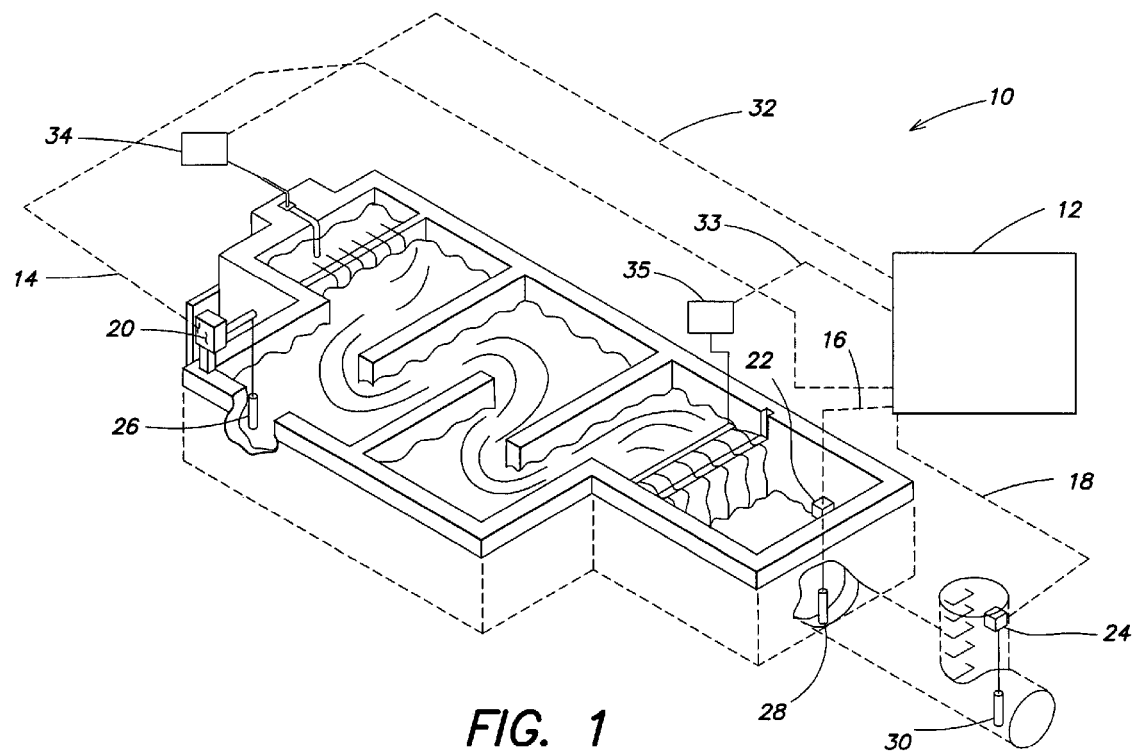
FIG. 1 is a schematic diagram of a water treatment system in accordance with one or more embodiments of the invention.

The invention is not limited in its application to the details of construction and arrangement of components, systems or subsystems set forth in the description, including the various examples or as illustrated in the drawings. The invention is capable of other embodiments and of being practiced or of being carried out in various ways. The terms used herein for the purpose of description should not be regarded as limiting. The use of the terms "comprising," "including," "carrying," "having," "containing," "involving," and the like are to be understood to be open-ended, i.e., to mean including but not limited to. Only the transitional phrases "consisting of" and "consisting essentially of" shall be closed or semi-closed transitional phrases, respectively, as set forth, with respect to the claims.

In accordance with one or more embodiments, the systems and techniques of the invention can be characterized as optimizing control of water treatment systems. The systems and techniques of the invention can identify or at least facilitate identification of one or more exceptional or other than normal conditions which can allow control of the treatment system in an alternate or secondary control type or mode. The systems and techniques of the invention can also be characterized as providing a control system or controller or utilizing a control system that incorporates unique logic techniques to override primary control when it may result in and reduce the likelihood of any unacceptable emission or discharge.

The systems and techniques of the invention can be further characterized as accurately and reliably controlling chlorination and, in some cases, dechlorination systems. The systems and techniques of the invention can provide a controller that can automatically switch from a primary, e.g. oxidation reduction potential, to a secondary, e.g. residual ppm, control based on predetermined, pre-selected, and/or programmed parameters.

The invention can be characterized as providing one or more controllers or techniques that can regulate the operation of one or more water or aqueous systems including, but not limited to, water and/or wastewater treatment systems that typically involves adding, to the fluid to be treated, one or more oxidizing compounds or species and, in some cases, adding one or more neutralizing compounds or species. For example, the systems and techniques of the invention can control or at least effect control of addition one or more of the oxidizing compounds, and/or control addition of one or more neutralizing compounds. In accordance with one or more embodiments of the invention, operation of a water or wastewater treatment system 10 comprising a contact chamber, exemplarily shown in FIG. 1, can be controlled utilizing one or more controllers 12 based on one or more transmitted input signals, represented as dashed lines 14, 16, and 18, from one or more input device assemblies 20, 22, and 24 including one or more sensors 26, 28, and 30 disposed, typically in fluid communication with fluid to be treated such as water or an aqueous medium in the contact chamber, thereby providing a measure of one or more operating parameters of the treatment system 10. Controller 12 can transmit one or more output signals 32 and 33 to one or more output devices 34 and 35 which can effect a change to the water treatment system 10 by, for example, introducing a change in a flow rate of one or more added compounds or species, a change in a flow rate of water or wastewater to be treated, and, in some cases, a change in concentration of one or more added compounds or species. Thus, the systems and techniques of the invention can effect a change in one or more controlled parameters in response to, or, in some cases, in anticipation of, a change in one or more operating parameters of the water or wastewater treatment system.

Other aqueous systems that can suitably utilize the systems and techniques of the invention include, for example, potable water disinfection systems, systems that utilize breakpoint chlorination techniques such as swimming pool or spa disinfection or treatment systems, industrial water systems, as well as chloraminization and dechloraminization systems.

Figure 2:
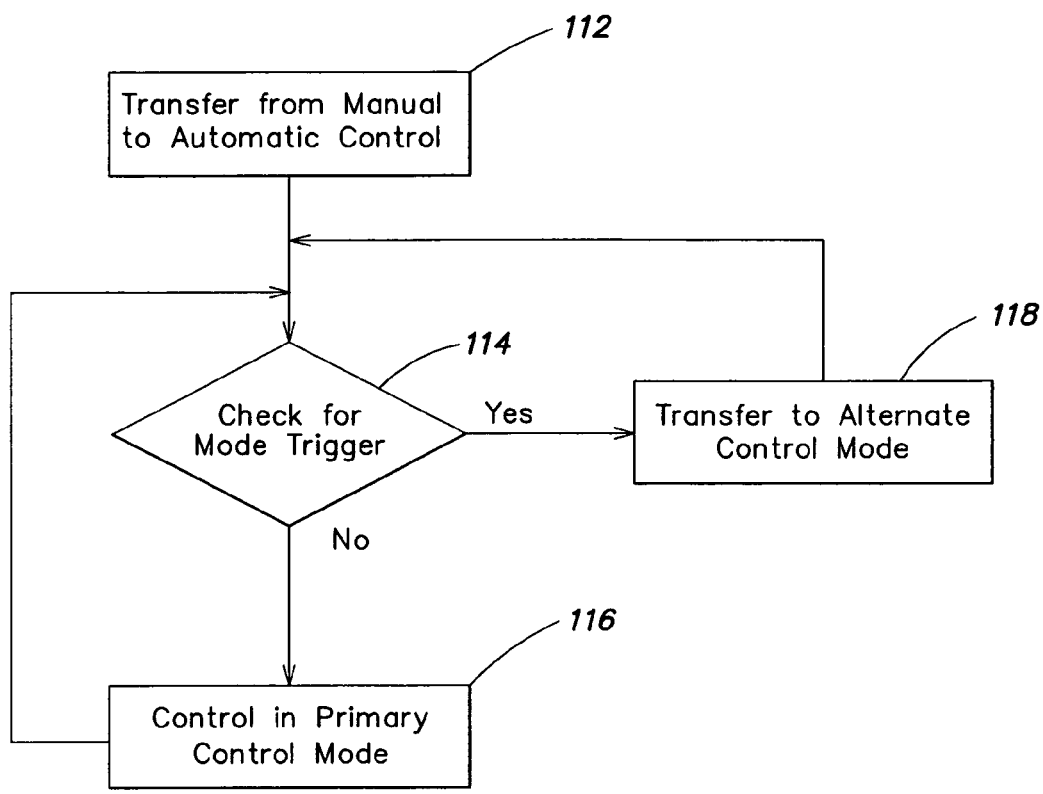
FIG. 2 is a flow diagram representatively illustrating at least a portion of the steps or acts utilized in operating, in particular, controlling a water or a wastewater treatment system, in accordance with one or more embodiments of the invention.

In accordance with one or more embodiments of the invention, the controller can execute one or more steps or acts as exemplarily shown in the flow diagram presented in FIG. 2. In some cases, one or more embodiments of the invention pertinent to computer readable and/or writable media can cause one or more controllers to execute one or more steps or acts in the flow diagram exemplarily presented in FIG. 2.

For example, in accordance with one or more embodiments of the invention, operation of controller 12 can be transferred from a manual state to an automatic control state 112.

In the manual state, a predetermined amount of a compound can be introduced from, for example, an output device 34 and/or 35 into the fluid to be treated in treatment system 10. Transfer from manual to automatic can be initiated by an operator of the treatment facility or, in some cases, automatically upon attainment of one or more predetermined conditions such as, but not limited to, a predetermined concentration, pH, temperature, and/or flow rate measurement or even according to a schedule. Transfer can be performed when a steady-state or near steady-state condition is identified. For example, automatic control state can be assumed when a flow rate of an oxidizing agent relative to a flow rate of the fluid to be treated is considered to be unchanged. In other cases, transfer to the automatic control state can be performed when a target compound dosage is achieved. In still other cases, a target compound dosage can be calculated or determined upon transfer to the automatic control state. For example, upon achieving a steady state operating condition, transfer to the automatic state can be performed; upon which, a dosage or rate of addition of the compound relative to the flow rate of fluid to be treated can be calculated and utilized as a target requirement during automatic operation.

In the automatic control state, the controller can, intermittently or continuously, check for one or more mode triggers 114. The mode trigger can be one or more conditions that typically would allow control of the treatment system under one or more control modes. In the absence of a mode trigger 114/No, the controller would typically supervise one or more control parameters of the treatment system in a normal or primary control mode 116. In the presence or identification of the mode trigger 114/Yes, the controller would typically supervise one or more control parameters in a secondary or an alternate control mode 118. Preferably, the controller, in primary control mode, can generate and transmit one or more first or primary output signals, represented as references 32 and 33 in FIG. 1, to one or more output devices 34 and 35, which likewise corresponds to one or more control parameters. The controller, in secondary or alternate control mode, can likewise generate and transmit one or more secondary or alternate output signals, also represented as references 32 and 33 in FIG. 1, to one or more output devices 34 and 35, which corresponds to one or more control parameters. The invention is not limited to the use of a single output device 34 or 35 and can include multiple output devices in a variety of configurations. For example, the controller can generate a first output signal in, for example, a first or primary control mode, to a first output device to regulate addition, removal, and/or a change in a first control parameter; the controller can further generate a second output signal in, for example, a second or alternate control mode, to a second output device to regulate addition, removal, and/or change in a second control parameter.

The one or more compounds can comprise one or more oxidizing agents that can neutralize or at least render inactive or inert at least one undesirable species in the fluid to be treated. In accordance with further embodiments of the invention, the compound can comprise one or more species that can affect the performance of the treatments system. For example, the compound can include a pH affecting or altering agent such as, but not limited to acids, bases, and buffers. Further, output device 34 can comprise a source of an oxidizing agent that can oxidize one or more undesirable species and treat the fluid in treatment system 10. For example, one or more of output devices 34 and/or 35 can comprise any one of a halogen donor, a free radical species donor, as well as combinations thereof. Output device 35 can comprise a source of a second oxidizing agent and/or one or more neutralizing agents that can react with or otherwise remove or reduce the concentration of one or more target species such as an oxidizing agent from output device 34. In other cases, output device 35 can comprise a source of a reducing agent that reduce or maintain a concentration of a target species to a tolerable or desired level. For example, output device 35 can comprise a reducing agent that neutralizes the oxidizing agent dispensed from output device 34 so that the concentration thereof in the discharging wastewater stream satisfies regulated requirements.

Control in the alternate control mode can be transferred back to primary control mode upon identification or realization of the absence of the mode trigger or upon satisfaction of one or more other triggers or conditions.

In accordance with further embodiments, the system and techniques of the invention can be characterized as performing in a primary control mode and, when appropriate, performing in an alternate control mode. In some cases, primary control can represent a normal control mode during which the systems and techniques of the invention are intended to operate and the secondary or alternate control mode can represent a second control or mode of operation of the systems and techniques of the invention. The invention can be further characterized as providing systems and techniques that facilitate operational control of one or more water systems by flexibly controlling one or more such systems in a first control mode as well as in other control modes. Thus, for example, the controllers of the invention can control or facilitate regulation, monitoring, and performance of one or more operating parameters of one or more water systems between, or to and from, a first mode, a second or alternate mode, and, in some cases, a third or even a fourth control mode.

Secondary control can be represented as providing a substitute control technique when the primary control indicates or is identified to be under a predetermined, exceptional condition, or under an alarm or failure condition. The systems and techniques of the invention can utilize one or more alternate channels that can provide a further indication of one or more operating parameters of the water system, preferably, independent of the primary, and/or the secondary control mode.

Thus, for example, the invention can provide a method of controlling addition of an oxidizing compound to a water treatment system. The method can comprise measuring a value of a process parameter of the water treatment system, generating a first control signal in a first control mode when the value of the process parameter is within a first range, and generating a second control signal in a second control mode when the value of the process parameter is within a second range.

In accordance with one or more embodiments, the systems and techniques of the invention can identify, and, if appropriate, trigger an alternate control mode, when, for example, an alarm condition is recognized. For example, primary control can utilize oxidation reduction potential to control or regulate addition of one or more oxidizing compounds to water in the water treatment system and secondary control utilizing residual concentration of a specific or target species can be assumed when a high or low alarm condition is satisfied or exceeded. In other cases, primary control can utilize residual concentration and secondary control utilizing oxidation reduction potential can be assumed with a low or a high residual concentration alarm condition. In still other cases, primary control can be based on residual concentration and secondary control utilizing oxidation reduction potential can be triggered upon identification of a high or low oxidation reduction potential alarm condition. In yet other cases, primary control can be based on residual concentration and secondary control still utilizing residual concentration, but with respect to a higher or lower set point reference or target can be performed upon identification of a high or low oxidation reduction potential alarm. In still further cases, primary control can be based on a measured oxidation reduction potential and secondary control based on measured residual concentration can be maintained under a high or low residual oxidizer concentration alarm condition. In yet further cases, primary control which can be based on a measured oxidation reduction potential with secondary control based residual oxidizer concentration can be utilized until an alternate control mode is assumed when a high or low residual concentration alarm condition is present.

In accordance with one or more embodiments of the invention, primary control based on, for example, a measured oxidation reduction potential with secondary control based on, for example, a measured residual concentration, of a specific or target species, can be maintained until a high or low measured oxidation reduction potential alarm condition is present, during which alternate control based on one or more alternate signals or channels can be utilized. In some cases, primary control based on a measured oxidation reduction potential along with secondary control based on a measured residual concentration can be maintained unless control can be effected utilizing one or more alternate channels, during conditions of a high or low residual concentrations. In still other cases, primary control, based on residual concentration, along with secondary control, based on a measured oxidation reduction potential, can be performed unless an alternate control channel is utilized during high or low residual concentration conditions. In yet other cases, primary control, based on residual concentration of one or more species, along with secondary control, based on oxidation reduction potential, can be performed unless control utilizing an alternate channel is performed when high or low oxidation reduction potential alarm conditions are present.

In accordance with one or more embodiments, the present invention can utilize primary control, based on residual concentration of one or more species, along with secondary control, based on oxidation reduction potential, until or unless an unacceptable condition is present characterized by an exceptional ratio of the value of the residual concentration to the value of the oxidation reduction potential. In some cases, the present invention can utilize primary control, based on oxidation reduction potential, along with secondary control, based residual concentration of one or more species, until, or unless an unacceptable condition is present characterized by, for example, an exceptional ratio of the value of the residual concentration to the value of the oxidation reduction potential. Other exceptional ratio conditions may also be utilized such as, but not limited to, a ratio of a concentration of one or more target species or even a ratio of oxidizer concentration to target species to target species concentration.

In accordance with one or more embodiments, the present invention can trigger a change in control mode to effect control based on a secondary input channel when the primary input channel is identified to be faulty. The primary input channel can send or receive one or more signals 14, 16, and 18 and a fault can be identified, for example, as any relevant condition associated with an inoperable or malfunctioning sensor. In some cases, the systems and techniques of the invention can assume control based on a target dosage, or even a fixed, predetermined or default addition rate, upon switching to a secondary or tertiary control condition or mode. In still other cases, the invention can determine, and if appropriate, utilize, a third control parameter that can be based on two or more primary input signals. For example, the third control parameter can be represented as hypochlorous acid concentration calculated or estimated based on a measured pH and a measured free chlorine concentration.

The process parameter can correspond to an oxidation reduction potential of water in the water treatment system. In accordance with some embodiments of the invention, the first control signal can be based on a difference between the value of the process parameter and a set point. In some cases, the first control signal can be further based on a rate of change of the value of the process parameter. In accordance with other embodiments of the invention, the second control signal can be based on a difference between the value of the process parameter and an alarm limit. The second control signal can be further based on a rate of change of the value of the process parameter.

In accordance with further embodiments, the systems and techniques of the invention can further comprise measuring a second process parameter of the water treatment system. In still further embodiments, the systems and techniques of the invention can further comprise generating a third control signal when a magnitude of a difference of a value of the second process parameter and a second set point is less than a tolerance. And in accordance with even further embodiments, the systems and techniques of the invention can further comprise generating a fourth control signal in a fourth control mode when the magnitude of the difference of the value of the second process parameter and the second set point is greater than the tolerance.

In accordance with one or more embodiments, the invention can provide a method of controlling addition of an oxidizing compound to a water treatment system. The method can comprise specifying a first set point representing a first desired operating condition of the water treatment system, specifying a second set point and a tolerance representing a second desired operating condition of the water treatment system, generating a first input signal corresponding to a first operating parameter of the water treatment system, generating a second input signal corresponding to a second operating parameter of the water treatment system, and generating a first output signal based on a difference between the first input signal and the first set point when a difference between the second input signal and the second set point is less than the tolerance. The method can further comprise generating a second output signal based on the first input signal and a second set point when the difference between the second input signal and the second set point is greater than the tolerance.

The first operating parameter can comprise an oxidation reduction potential of the water in the water treatment system. The second operating parameter can comprise a concentration of the oxidizing species in the water treatment system. In accordance with some embodiments of the invention, generating the first output signal can be based on a lag time of water flowing in the water treatment system and, in accordance with still other embodiments, generating the first output signal can be further based on a rate of change of one of the first input signal. Generating any of the output or control signals can utilize or involve at least one of adaptive, flow adjusted lag time, proportional, proportional-integral, proportional-derivative, and proportional-integral-derivative control algorithms.

In accordance with one or more embodiments, the invention can provide a method of controlling addition of a compound to a water treatment system. The method can comprise specifying a primary set point representing an operating condition of the water treatment system; measuring a primary operating parameter and a secondary operating parameter of the water treatment system; generating a first output signal based on the primary operating parameter and the primary set point; identifying an alternate control mode when at least one condition selected from the group consisting of a low first operating parameter, a high first operating parameter, a low second operating parameter, and a high second operating parameter is present; and generating an alternate output signal based on at least one of the primary operating parameter and the secondary operating parameter when the alternate control mode is identified. The first operating parameter can correspond to an oxidation reduction potential of water in the water treatment system and the second operating parameter corresponds to a concentration of an oxidizing species in the water treatment system. The alternate output signal can be based on the primary operating parameter and an alternate set point.

The alternate output signal can be based on the secondary operating parameter and an alternate set point. The first operating parameter can correspond to a concentration of an oxidizing species in the water treatment system and the second operating parameter corresponds to an oxidation reduction potential of water in the water treatment system.

In accordance with one or more embodiments, the invention can provide a water treatment system. The water treatment system can comprise an input device disposed to measure an operating parameter of the water treatment system and generate a corresponding input signal; a controller disposed to receive and analyze the input signal and generate a first output signal based on a first difference between the input signal and a first set point value and a second output signal based on a second difference between the input signal and a second set point value; and an output device disposed to receive the first and second output signals and regulate addition of an agent to the water treatment system.

In accordance with one or more embodiments, the invention can provide a water treatment system comprising a first measurement device disposed to measure a first parameter of the water treatment system and generate a first input signal, a second measurement device disposed to measure a second parameter of the water treatment system and generate a second input signal, a controller disposed to receive and analyze the first input signal and the second input signal and generate a first output signal when a difference between the second input signal and a second set point value is less than a tolerance and generate a second output signal when the difference between the second input signal and the set point value is greater than the tolerance, and an output device disposed to receive at least one of the first and second output signals and regulate addition of an oxidizer to the water treatment system. The first parameter can correspond to an oxidation reduction potential of water in the water treatment system and, in some cases, the second parameter can correspond to a concentration of the oxidizer in the water treatment system. The first set point value can be ORP at, for example, about 400 mV or any predetermined value or range.

In accordance with one or more embodiments, the invention can provide a water treatment system comprising a first sensor or measurement device disposed in the water treatment system such as a sensor that can provide an indication of an oxidation reduction potential (ORP, also referred to as HRR) of water or wastewater in the treatment system; a second sensor disposed in the water treatment system such as an amperometric sensor or any similar sensor that can provide an indication or representation of concentration of one or more species or agents in the water or wastewater; a means for controlling addition of an oxidizing species or agent to the water or wastewater in the treatment system in response to a signal from, for example, at least one of the ORP sensor and the amperometric sensor; and a means for identifying and controlling addition of the oxidizing species in an alternate control mode in response to a signal from, for example, at least one of the sensors, such as the ORP sensor or the amperometric sensor, when at least one condition selected from the group consisting of a low first operating parameter, a high first operating parameter, a low second operating parameter, and a high second operating parameter is present.

The present invention is not limited to any particular type of sensing device and can utilize one or more sensing devices and/or one or more types of sensor design such as, but not limited to, electrochemical devices, membrane-based devices, as well as ultrasonic-based sensor for sensing chlorine, combined chlorine, bromine, hypochlorus acid, chlorine dioxide species concentration, and/or pH. Thus, sensor or measurement devices such as amperometric, oxidation reduction potential, tri-amperometric and membrane devices can be utilized in the systems and techniques of the present invention.

The output signal of the controllers of the present invention can control, actuate, and/or energize devices such as pumps, valves, and motors. The controller output signal may be generated to influence the feed rate of oxidizers such as chlorine, hypochlorite, bromine and other process chemicals. In addition the controller output signal may be configured to influence the feed rate of reducing agents such as sulfur dioxide, sodium bisulfite and other process chemicals.

The controllers of the invention can include one or more processor and can, for example, comprise a computer. One or more embodiments of the invention may include, among other components, a plurality of known components such as one or more processors, memory systems, disk storage systems, network interfaces, and busses or other internal communication links interconnecting the various components. One or more of the components of the systems of the invention may reside on a single control system e.g., a single microprocessor, or one or more components may reside on separate, discrete systems, e.g. a network of computers. Further, one or more components of the systems of the invention may be distributed or represented across multiple control systems. Different aspects or portions of the components of system 10 may reside or be represented in different areas of memory (e.g., RAM, ROM, disk, etc.) on the control system. In some cases, different portions of the control system may be present or utilized in one or more locations remotely positioned from each other and/or water system 10. Thus, for each of the one or more systems that can include one or more components of the systems of the invention, each of the systems and/or components thereof may reside or be utilized in one or more locations.

The methods of the invention, acts thereof, and various embodiments and variations of the methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBAL, etc., or any of a variety of combinations thereof. The computer-readable medium on which such instructions are stored may reside on one or more of the components of system described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

In accordance with one or more embodiments, the invention can provide a computer-readable medium having computer-readable signals stored thereon that define instructions that, as a result of being executed by a computer, instruct the computer to perform a method of controlling addition of an oxidizer compound to a water treatment system comprising acts of generating a first control signal in a first control mode when a value of a process parameter of the water treatment system is within a first range and generating a second control signal in a second control mode when the value of the process parameter is within a second range.

The first control signal can be based on a difference between the value of the process parameter and a set point. The first control signal can be further based on a rate of change of the value of the process parameter. The process parameter can correspond to an oxidation reduction potential of water in the water treatment system.

In accordance with one or more embodiments, the invention can provide a computer-readable medium having computer-readable signals stored thereon that define instructions that, as a result of being executed by a computer, instruct the computer to perform a method of controlling addition of an oxidizer compound to a water treatment system comprising acts of receiving a first input signal from a first input device disposed to measure a first operating parameter of the water treatment system, receiving a second input signal from a second input device disposed to measure a second operating parameter of the water treatment system, generating a first output signal based on the first input signal and a first set point when a difference between the second input signal and the second set point value is less than a tolerance, and generating a second output signal based on the first input signal and a second set point when the difference between the second input signal and the second set point value is greater than the tolerance.

Although several of the steps or acts described herein have been described in relation to being implemented on a computer system or stored on a computer-readable medium, aspects of the invention are not limited as such, as steps or acts may be implemented without use of a computer by, for example, a person.

Various embodiments according to the invention may be implemented on one or more computer systems. These computer systems may be, for example, general-purpose computers such as those based on any one or more PENTIUM® processors available from Intel Corporation, Santa Clara, Calif.; PowerPC™ processors available from Motorola, Inc., Schaumburg, Ill.; UltraSPARC® processors available from Sun Microsystems, Inc., Santa Clara, Calif.; PA-RISC architecture based processors available from, for example, Hewlett-Packard Corporation, Palo Alto, Calif.; or any other type of processor. It should be appreciated that one or more of any type computer system may be used to control one or more wastewater treatment systems in one or more control modes according to the embodiments of the invention. Further, the software design system may be located on a single computer or may be distributed among a plurality of computers attached by, for example, a communications system, or network.

Further, a general-purpose computer system according to one embodiment of the invention can be configured to perform to control one or more wastewater treatment systems in one or more control modes. It should be appreciated that the system may perform other functions, including, for example, monitor pH, monitor material inventories, create, and/or send reports, including, for example, status reports or even alarm reports, to one or more stations, individuals, or organizations. The invention is not limited to having any particular function or set of functions described above.

For example, various aspects of the invention may be implemented as specialized software, embodied, for example, in a computer-readable medium, executing in a general-purpose computer system. The computer system may include a processor connected to one or more memory devices, such as a disk drive, flash drive, memory, or other device for storing data, which can be used for storing programs and data during operation. Components of the computer system may be coupled by one or more interconnection mechanisms, which may include one or more busses, e.g., between components that are integrated within a same machine, and/or a network, e.g., between components that reside on separate discrete machines. The interconnection mechanism preferably enables communications, e.g., data, instructions, to be exchanged between system components of the computer system or even the controller, which can utilize wired or by wireless communication techniques. The computer system can also include one or more input devices such as, but not limited to keyboards, mouse, trackballs, microphones, touch screens, as well as one or more output devices such as, but not limited to, printing devices, display screens, alarm indicators, and speakers. In addition, the computer system may contain one or more interfaces that connect the computer system to a communication network, in addition or as an alternative to the network that may be formed by one or more of the components of system.

The systems of the invention can include one or more computer readable and writeable nonvolatile recording media in which signals can be stored that define a program or algorithm to be executed by the processor or information stored on or in the medium to be processed by the program. The medium may have various forms and can be utilized as, for example, a disk, or flash memory. Typically, in operation, the processor causes data to be read from the nonvolatile recording medium into another memory structure that can allow for faster access to the information by the processor than does the medium. This memory can be a volatile, random access memory such as a dynamic random access memory (DRAM) or static memory (SRAM). It may be located in a storage system or in a memory system in communication with one or more processors. In some cases, the processor can manipulate the data within one or more integrated circuit memory structures and can then copy the data to the medium after processing is completed. A variety of mechanisms can be utilized to manage data movement between the medium and the integrated circuit memory element, and the invention is not limited thereto. Further, various types of memory structures or subsystems can be utilized and the invention is not limited to a particular memory system or storage system.

The controllers of the invention may utilize and/or include specially-programmed, special-purpose hardware including, for example, application-specific integrated circuit (ASIC) devices. Various aspects of the invention may be implemented in software, hardware or firmware, or any combination thereof. Further, such methods, acts, systems, system elements and components thereof may be implemented as part of the controller described herein or as an independent component thereof.

The various systems of the invention may comprise one or more general-purpose computer system that is programmable using any suitable high-level computer programming language. The controllers of the invention may be also implemented using specially programmed, special purpose hardware. The controllers of the invention can utilize one or more processors or microprocessors which are typically commercially available processors and can be, for example, PENTIUM® processors available from Intel Corporation, Santa Clara, Calif. Other commercially available processors can be utilized including any that can employ one or more operating systems which may be, for example, WINDOWS® 95, WINDOWS® 98, WINDOWS® NT, WINDOWS® 2000 (WINDOWS® ME) or WINDOWS® XP® operating systems, each available from Microsoft Corporation, MAC® OS System X® available from Apple Computer, Solaris operating system available from Sun Microsystems, or UNIX operating system available from various sources such as Linux. Other operating systems may be used, and the present invention is not limited to any particular implementation.

Typically, the processor and operating system together define a computer platform for which application programs in high-level programming languages are written. It should be understood that the invention is not limited to a particular computer system platform, processor, operating system, or network. Also, the present invention is not limited to a specific programming language or computer system. Further, it should be appreciated that other appropriate programming languages and other appropriate computer systems could also be used.

One or more portions of the systems of the invention may be distributed across one or more computers (not shown) coupled to a communications network. These computer systems may also be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, e.g., IL, or interpreted, e.g., Java, code which communicate over a communication network, e.g., the Internet, using a communication protocol, e.g., TCP/IP. Thus, one or more components may be located remotely from the treatment system and be in communication therewith through any one or more techniques including, for example, by radio, network, virtual network, or even through the Internet.

It should be appreciated that the invention is not limited to executing on any particular system or group of systems. Also, the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI), or perform other functions). Various aspects of the invention may be implemented as programmed or non-programmed elements, or combinations thereof.

The above-described embodiments of the present invention can be implemented in any of numerous ways. For example, the above-discussed functionality for identifying a control mode change can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above.

In this respect, one implementation of the embodiments of the present invention comprises at least one computer-readable medium (e.g., a computer memory, a floppy disk, a compact disk, a tape, flash memory, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code, e.g., software or microcode, which can be employed to program a processor to implement the above-discussed aspects of the present invention.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

Figure 3:
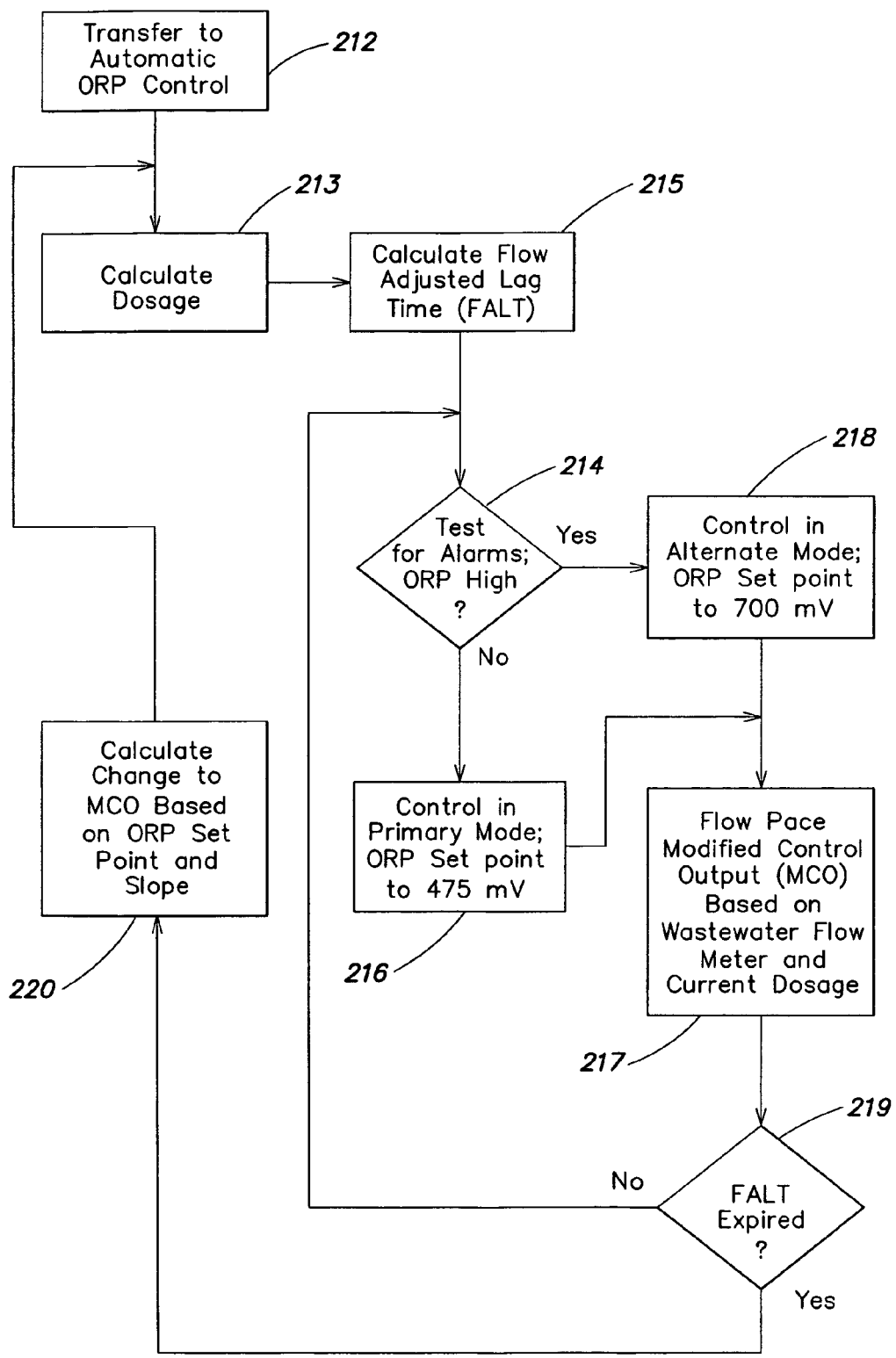
FIG. 3 is a flow diagram representatively illustrating at least a portion of acts utilized in controlling a water or a wastewater treatment system, in accordance with one or more embodiments of the invention.

FIG. 3 schematically shows a flow diagram of a control technique that can be implemented to control chlorination and/or dechlorination of a treatment system, exemplarily shown in FIG. 1, in accordance with one or more embodiments of the invention.

The controller can be operated by transferring 212 from manual control state to an automatic control state when suitable or desired by an operator of the treatment system. Upon transfer 212, the controller typically determines 213 a current dosage, which can be used as a target requirement pertinent to operation of the treatment system. For example, the dosage can be determined by relating a rate of addition of a compound, such chlorine, to a rate of fluid flow. The ORP of the fluid to be treated in the treatment system can also be measured by utilizing one or more sensors. Thus, the controller can utilize the determined dosage and seek to achieve this dosage as one operating requirement.

The controller can check or determine if a change in control modes is appropriate by, for example, testing 214 for an ORP high alarm condition. If a control mode change is not detected 214/No, control of the treatment system is performed under a normal or primary control mode 216. If a control mode change is detected 214/Yes, control of the treatment system is performed under an alternate control mode 218.

Under primary control mode, a control channel can regulate addition of one or more compounds to the treatment system. For example, the controller can regulate addition of an oxidizing agent, such as chlorine or other sanitizers, to achieve an ORP set point of about 475 mV in water in the treatment system.

Under secondary control, the controller can regulate addition of the same or different compounds, with or without a change in an operating parameter. For example, the controller can regulate addition of chlorine based on an alternate ORP set point equal to the high ORP alarm value, e.g. about 700 mV, or to a low ORP alarm value. The controller can thereby generate an alternate output signal based on, for example, a difference between a measured process parameter and the alternate target set point, e.g. the difference between the measured ORP and the alternate ORP set point of 700 mV.

Control under the primary or alternate control mode can further comprise modifying the output signal by utilizing flow pace techniques 217 that incorporate or compensate for operating fluctuations of the fluid to be treated. For example, the controller can modify the output signal based on the measured ORP value and a rate of change of the measured ORP value, e.g. the output signal can be weighted to be based on a difference between the ORP set point of 700 mV and a rate of change of the measured ORP.

The controller can utilize flow adjusted lag time (FALT or $T_f$) control techniques. $T_f$ can be calculated 215 to compensate for variations in measured flow rate such that $T_f = (T_1 \cdot K_f \cdot F_{\%})$ where $T_1$ is the system's inherent lag time, $K_f$ is a flow factor, and $F_{\%}$ is an averaged flow rate, in percent relative to a design flow rate of the system. FALT is the calculated time based on the change in incoming flow relative to the fixed sensor(s) location(s).

The controller can query whether the flow adjusted lag time has elapsed; if so 219/Yes, then the controller can proceed to calculate a change in modified or modulated control output (MCO) based on the ORP set point and the slope of the measured ORP; otherwise 219/No, the controller can return to querying 214 to determine if a control mode change is appropriate.

MCO is the control algorithm that varies the output of the controller based on the measured sensor inputs and the ORP set point. FALT is utilized to determine the time required between MCO changes.

Example 2

Figure 4:
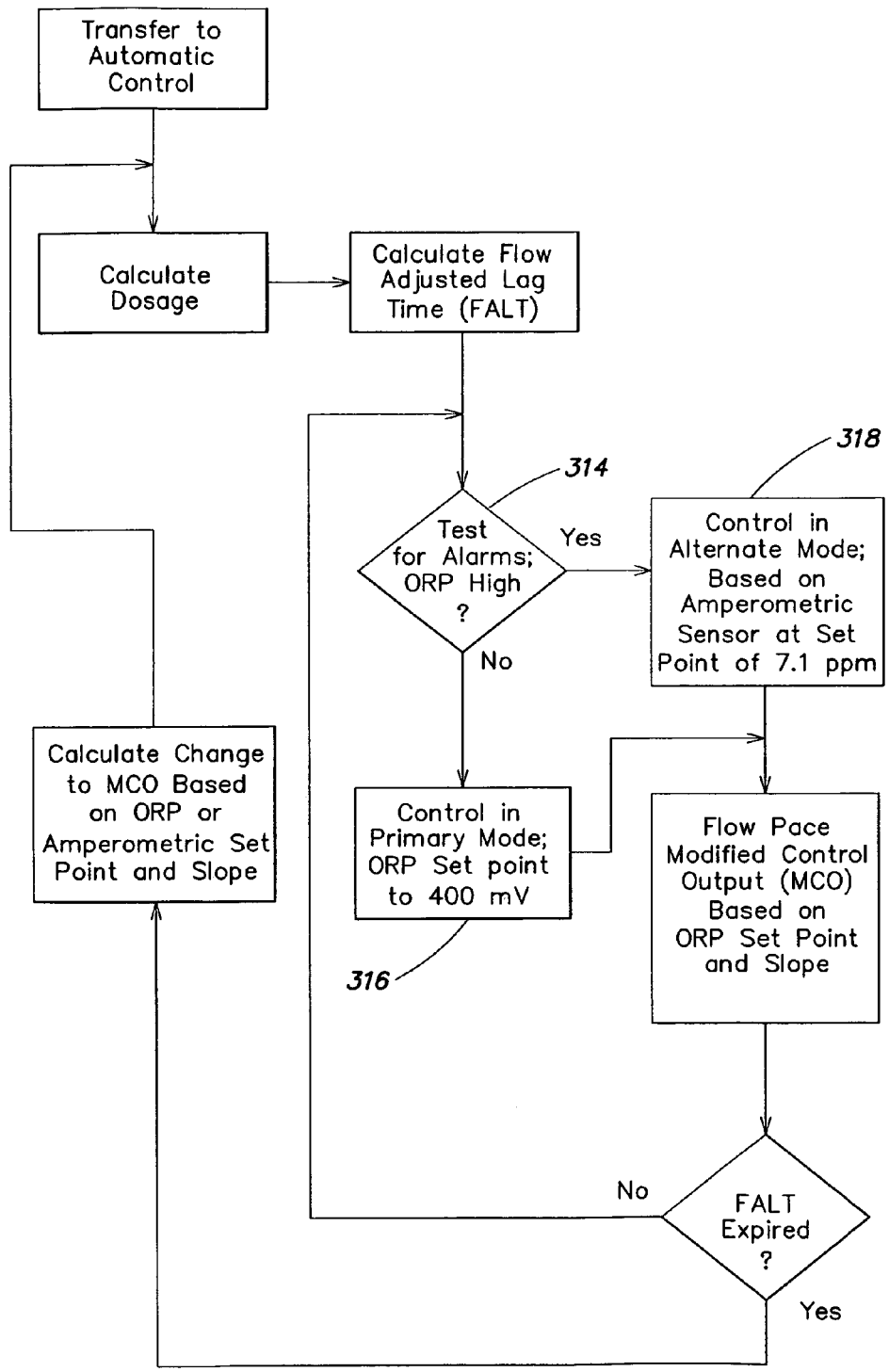
FIG. 4 is a flow diagram representatively illustrating at least a portion of acts utilized in controlling a water or a wastewater treatment system, in accordance with further embodiments of the invention.

FIG. 4 schematically shows a flow diagram of another control technique that can be implemented to control chlorination and/or dechlorination of a treatment system, exemplarily shown in FIG. 1, in accordance with further embodiments of the invention. The control system in this example, like the control system described in Example 1, can also perform one or more query operations 314 to identify whether control should be performed in a primary control mode 316 or to control in a secondary or alternate control mode 318. As with the previous example, the change in control mode can be triggered by, for example, recognizing a high ORP level. However, the alternate control mode 318, as in this example, can be based on a second measured parameter, exemplarily shown as the amperometric measurement with a predetermined or pre-selected set point value of about 7.1 ppm.

Example 3

A wastewater treatment system (SWWTP), schematically shown in FIG. 1 was operated utilizing a STRANTROL 960 controller, available from USFilter, Stranco Products, Bradley, Ill. An oxidizing agent, chlorine, from output device 34 was fed to disinfect the wastewater. A reducing agent, a sulfite species, from output device 35 was introduced to the treated wastewater before discharge from the contact chamber to reduce the concentration of chlorine to within regulated levels. Flow of water to be treated is shown from upper left to lower right.

With reference to FIGS. 1-3, in primary control mode 116 and 216, upon transfer 112 and 212 from manual to automatic control, controller 12 calculated 213 a dosage based on the flow of wastewater (flow meter input) and current output to oxidant feeder (chlorinator). Controller 12 also calculated 215 a flow adjusted lag time according to the formula $$T_f = (T_1 \cdot K_f F_\%)$$

where $T_1$ is the system's inherent lag time, $K_f$ is a flow factor, and $F_\%$ is an averaged flow rate, in percent relative to a design flow rate of the treatment system.

Controller 12 further modified 217 the output signal by incorporating flow pacing techniques. The flow paced output signal was generated based on a measured flow rate of the wastewater to be treated by a flow meter (not shown).

If FALT has not expired 219/No, controller 12 performed primary control 216 by generating an output signal to output device 34 based on the flow rate of the wastewater stream.

If FALT has expired, a new MCO was calculated 220 based on the ORP deviation from set point and the rate of change (slope) of the measured ORP of the wastewater stream, specifically, the rate of change of ORP within the previous 10% of the FALT period. The control sequence was then returned to calculating the dosage based on the new MCO 213.

Figure 5:
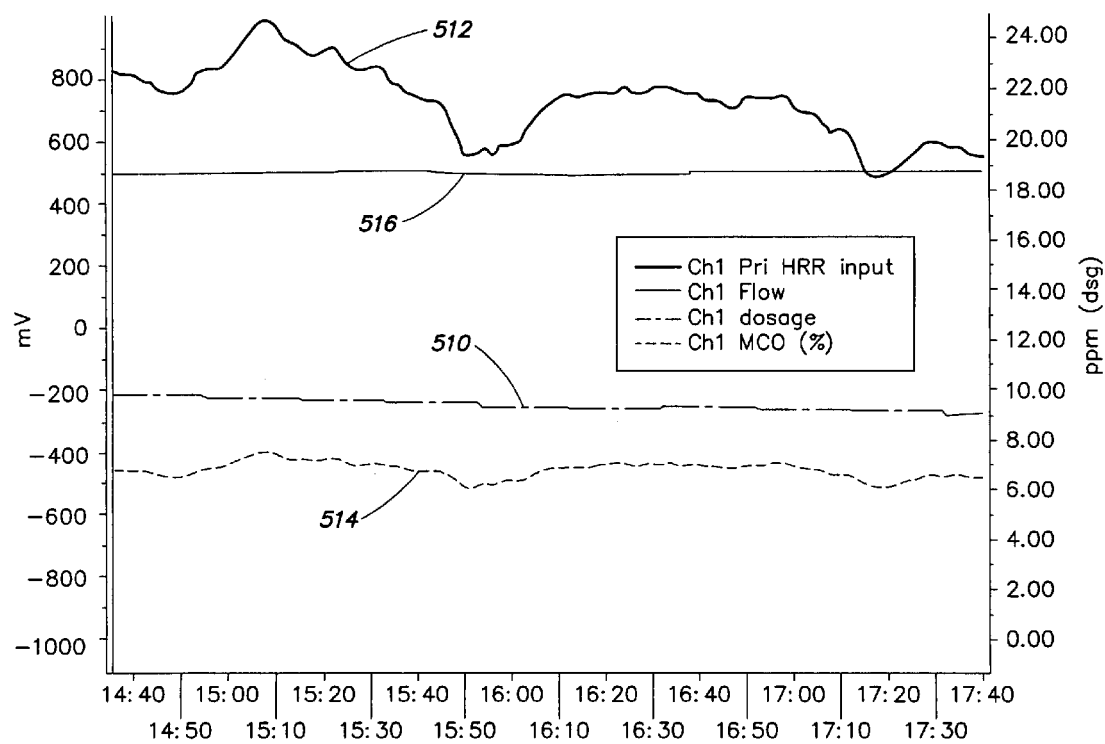
FIG. 5 is a graph showing measured parameters of a wastewater treatment system controlled in accordance with one or more embodiments of the invention.

FIG. 5 is a copy of a computer display showing the dosage value 510 (in ppm) of the chlorine oxidizer as a function of elapsed time. As shown, at a time of about 14:35, the dosage was relatively steady and the corresponding controller-generated output 512 varied based on the flow rate 514 of the wastewater. At about 14:52, the FALT has expired 219/Yes and a new MCO was calculated 220 based on the deviation from the ORP 516 set point (shown as HRR) and its slope. A new dosage was then calculated 213 based on the new MCO and the measured flow rate 514. A new FALT was also determined 215. Control was based on the new, revised (lower) dosage. Flow pacing 217 proportionally biased the output signal to the chlorine feeder (output device) relative to the currently measured flow rate 514.

The measured ORP 516 (mV) (slightly above the ORP set point of about 475 mV) of the wastewater is also shown as a function of time.

Control was performed in primary mode throughout the duration shown in FIG. 5 because the measured ORP was maintained within a desired tolerance band even with fluctuating wastewater stream flow rate.

Example 4

In this example, the wastewater treatment system was operated also utilizing a STRANTROL 960 controller, available from USFilter, Stranco Products, Bradley, Ill., under primary control as substantially described in Example 3 and was operated under secondary control that was triggered by a high alarm condition.

Figure 6:
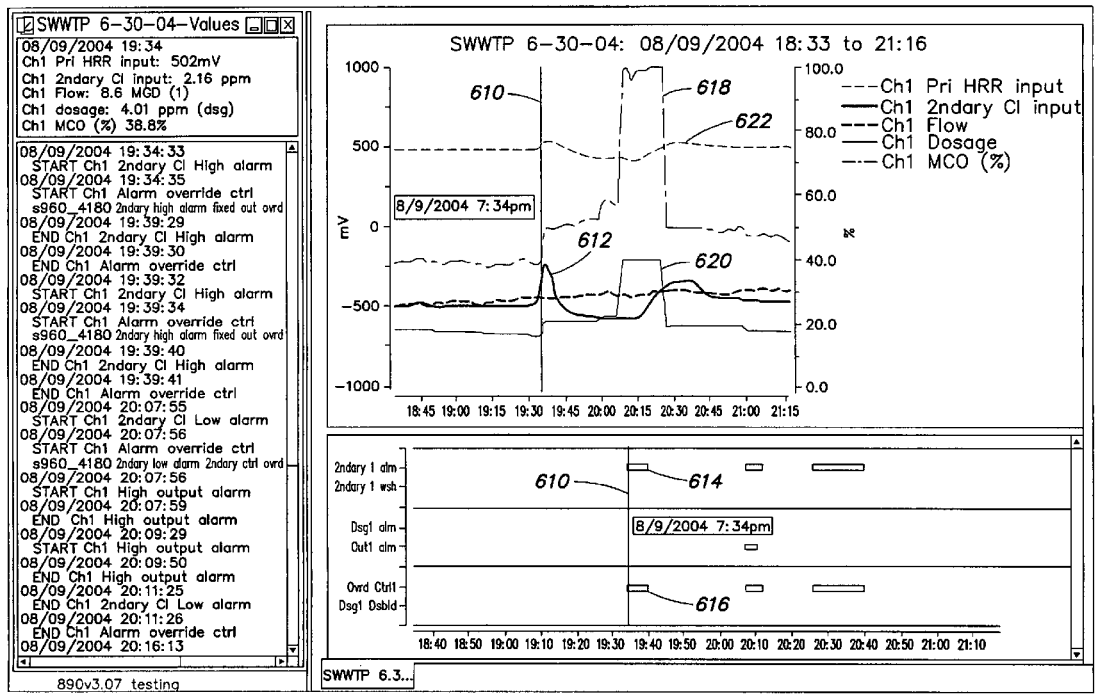
FIG. 6 is a copy of a computer screen capture of a wastewater treatment system controller showing a change in control modes (from a primary control mode based on measured ORP to an alternate control mode based on fixed MCO output) in accordance with one or more embodiments of the invention.

FIG. 6 is a copy of a computer screen capture of the SWWTP process conditions showing measured operating conditions and control parameters as a function of time. Prior to a time of about 19:34 (indicated by the vertical bars 610 and captioned 7:34 p.m. in both upper and lower right frames), control was performed under primary control, based on an ORP set point as substantially described in Example 3. At about 19:34, an alarm condition (chlorine level greater than 2 ppm) was identified corresponding to an amperometrically-measured high chlorine residual level (about 2.16 ppm) and displayed as "Ch1 2ndary Cl input" 612. Shortly thereafter, control mode was changed to an alternate control mode identified as "START Ch1 Alarm override ctrl." FIG. 6 also shows the duration of the alarm condition 614 (labeled as "2ndary1 alm") and the alternate control mode 616 (labeled as "Ovrd Ctrl1"). In the alternate control mode, the controller was configured to produce a fixed output 618 (labeled as "Ch1 MCO (%)") of about 50% (shown as 49.5% in FIG. 7) additionally above the point where it was feeding before the alarm condition (38.8%). FIG. 6 also shows the responses, increased chlorine 620 ("Ch1 dosage") associated the corresponding increase, and measured ORP 622 ("Ch1 Pri HRR input").

Figure 7:
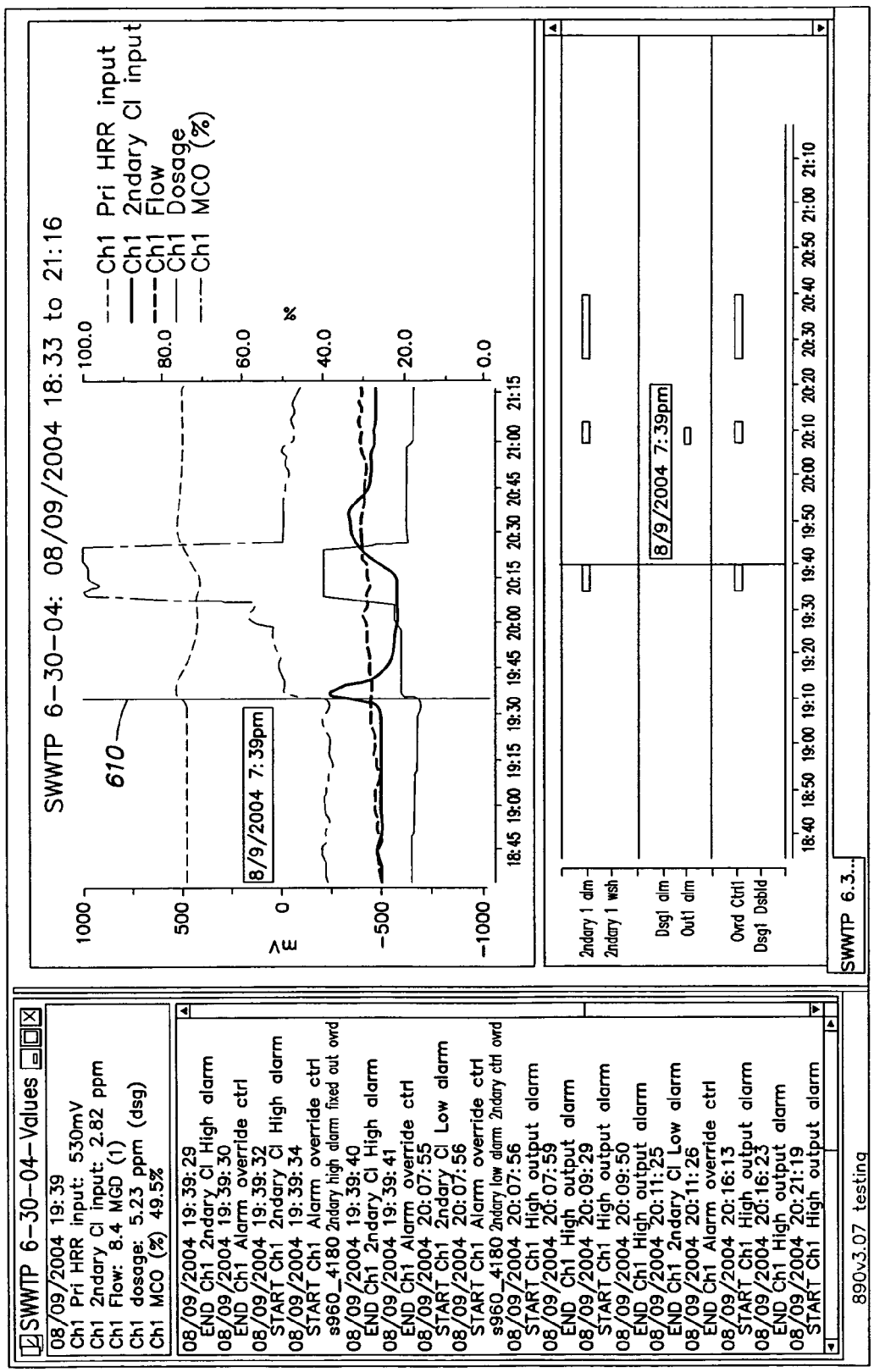
FIG. 7 is a copy of the computer screen capture of FIG. 6 highlighting a second change in control modes (from the alternate control mode to the primary control mode) in accordance with one or more embodiments of the invention.

FIG. 7 is a copy of a computer screen capture of the SWWTP process conditions wherein the bar 610 has been advanced about five minutes (captioned as "7:39 p.m.") after its position shown in FIG. 6. At this point, the alternate control mode ended (labeled as "END Ch1 Alarm override ctrl") and control was performed under primary control. This control change was initiated because the alarm initiating the override "2ndary high alarm" fell below the alarm point (about 2.00 ppm) and primary control resumed at the current control dosage (about 5.28 ppm up from about 4.01 ppm).

Also shown in FIGS. 6 and 7 is a recurrence of the change to alternate control mode for about six seconds at about 19:39:34 to about 19:49:40. In this case, because the output was already at about the additional 50% level, no control response is shown.

At about 19:39:41 ("END Ch1 Alarm override ctrl"), the controller switched to primary control because the alarm condition ended.

At about 20:07, the 2ndary input (Cl ppm) dropped to the low alarm point of about 0.50 ppm, which in turn, initiated an override to switch control to the 2ndary input at a set point of about 1.25 ppm. This caused the MCO to be recalculated based upon a deviation from set point using the current control input (0.50 ppm) and the setpoint of about 1.25 ppm, which increased the output from about 50% to about 100%. The controller flow-paced for a few minutes at a dosage of about 10.02 ppm until about 20:11:25 when the low chlorine alarm rose above the hysteresis value of about 0.05 ppm and then the alarm and override control reset. The primary ORP (also referred to as HRR) control resumed at about 20:11:26 at a dosage of about 9.98 ppm and a setpoint of about 480 mV.

Before the next FALT expiration at about 20:26, the 2ndary input reached high alarm point (about 3 ppm) which caused a fixed output override condition at about 50%. This override condition existed or was maintained until the 2ndary residual input dropped below the alarm point at about 20:39:10 then bounced back into override and back out at about 20:39:14. After this recovery the system resumed ORP primary control at a setpoint of about 480 mV and all alarms were reset.

Example 5

In this example, the wastewater treatment system as described in the previous examples was controlled utilizing a primary control mode (based on ORP) and a secondary control mode (based on measured chlorine residual).

Figure 8:
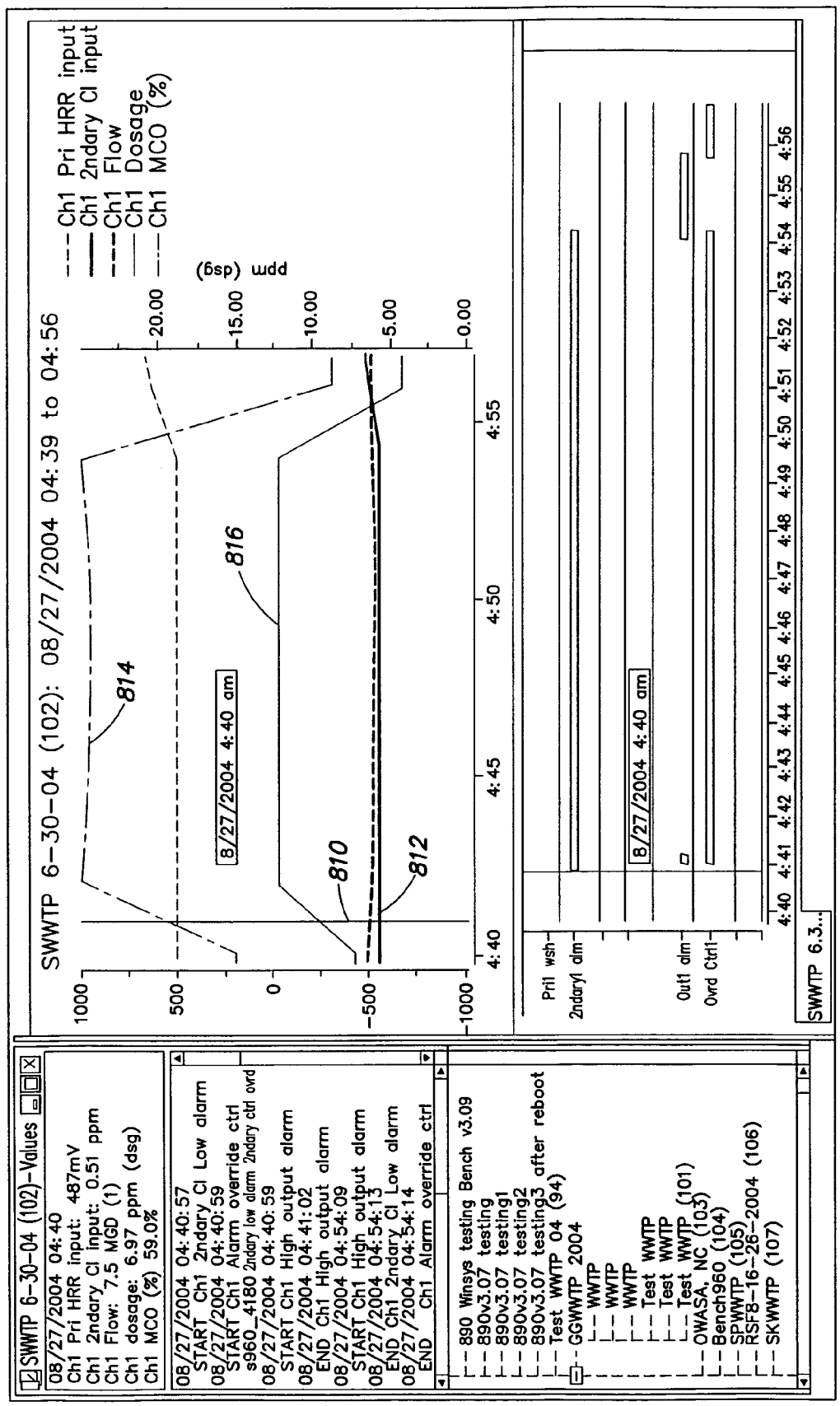
FIG. 8 is a copy of a computer screen capture of a wastewater treatment system controller showing a changes in control modes (from a primary control mode based on ORP to an alternate control mode based on measured residual chlorine level and back to the primary control mode) in accordance with one or more embodiments of the invention.
Figure 9:
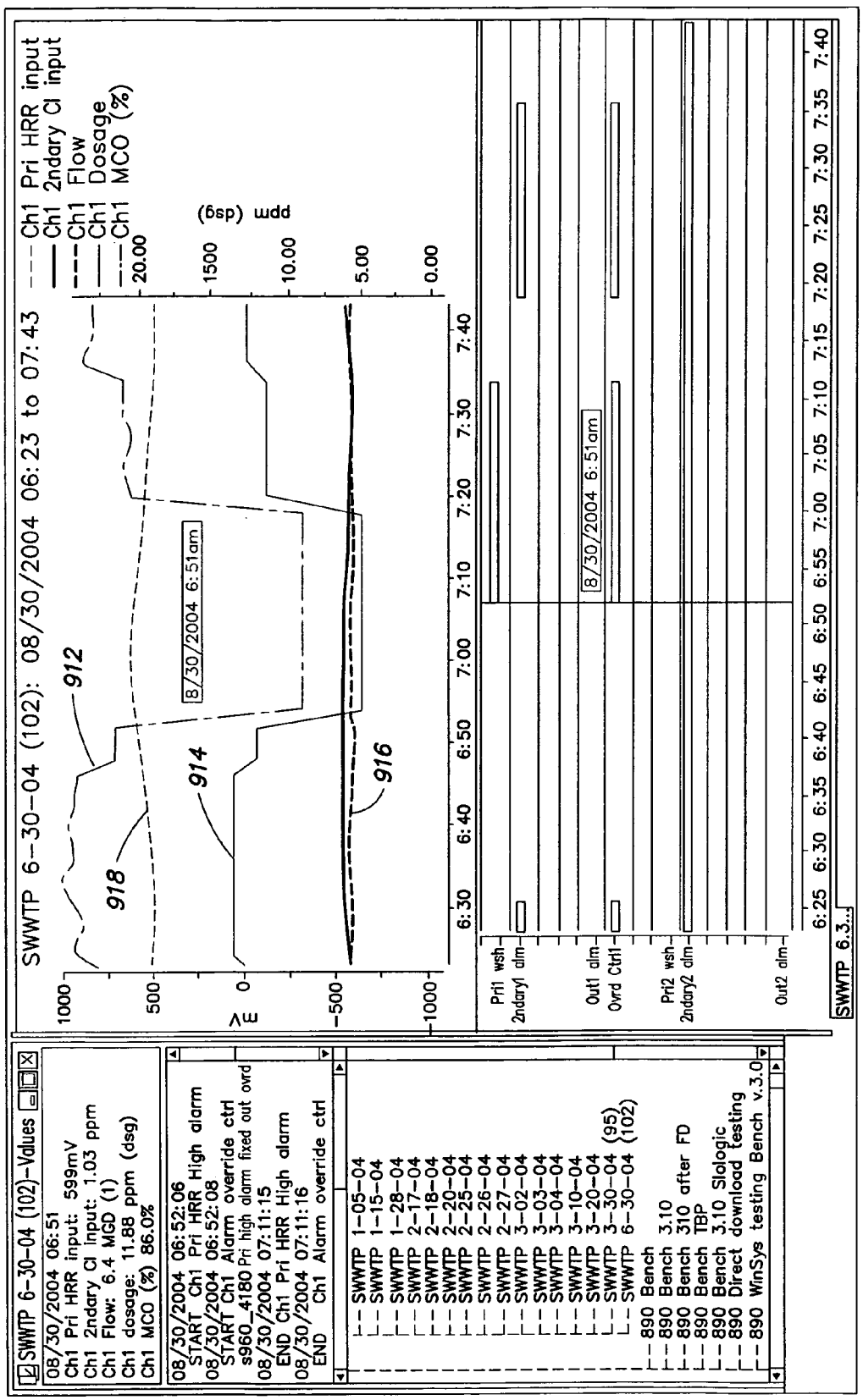
FIG. 9 is a copy of a computer screen capture of a wastewater treatment system controller showing a change in control modes (from a primary control mode based on ORP to an alternate control mode based on a fixed MCO level and back to the primary control mode) in accordance with one or more embodiments of the invention.

As shown in FIG. 8, which is a copy of a computer screen display of the wastewater treatment system controller, alternate control mode from primary control mode (based on ORP) was triggered at about 04:40:59 (indicated by the vertical bars 810) when the input signal corresponding to amperometrically measured chlorine level 812 in the wastewater was determined to be (about 0.50 ppm) below the lower alarm level. The alternate control mode was based on total chlorine level residual. In this alternate control, the MCO 814 and the dosage 816 was ramped up to raise the residual chlorine level. After several minutes, a detected rise in the residual chlorine level at about 04:54 triggered a change in control mode to revert to primary control, based on ORP.

Example 6

In this example, the wastewater treatment plant as described in the previous examples was operated under a primary control mode (based on ORP) and an alternate control mode (fixed output level). A high ORP level (599 mV) triggered (at about 06:51) the change from the primary control mode to the alternate control mode. Control based on fixed MCO output level 912, with corresponding chlorine dosage rate 914, which was flow paced based on the flow rate 916, was performed until the measured ORP 918 reduced to within acceptable limits.

Example 7

The following table lists overrides that can be utilized in the above examples to trigger or initiate a control mode change.

| 1st Priority Override | |
|---|---|
| Ch1 1st priority ovrd src/type | Pri high alarm fixed out ovrd |
| Ch1 Pri HRR high alarm fixed out | 35.0% |
| 2nd Priority Override | |
| Ch1 2nd priority ovrd src/type | Pri low alarm dosage ovrd |
| Ch1 Pri HRR Low alarm dosage out | 10.00 ppm (dsg) |
| Ch1 Pri HRR low alarm fixed out | 60.0% |
| 3rd Priority Override | |
| Ch1 3rd priority ovrd src/type | 2ndary low alarm 2ndary ctrl ovrd |
| Ch1 3rd priority ovrd feed pt | 1.25 ppm |
| 4th Priority Override | |
| Ch1 4th priority ovrd src/type | 2ndary high alarm alt Pri feed point ovrd |
| Ch1 4th priority ovrd feed pt | 400 mV |

A 4$^{th}$ priority override (such as 2ndary Cl Residual High alarm) that can cause the controller to change to a 400 mV set point, for example, can be ignored if a higher priority alarm (e.g. Primary HRR high alarm) occurs, and control can change to the higher priority control override (e.g. fixed output of 35%).

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. It is to be appreciated that various alterations, modifications, and improvements can readily occur to those skilled in the art and that such alterations, modifications, and improvements are intended to be part of the disclosure and within the spirit and scope of the invention. For example, the invention contemplates the use of various wired or wireless protocols to effect communication between systems, subsystems, and/or components thereof. For example, the various systems, subsystems and techniques of the invention can be implemented utilizing any suitable communication method including wired and wireless protocols. The invention contemplates retrofitting or modifying existing facilities or systems to incorporate the features, systems, subsystems, and techniques of the invention. Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, any of the means-plus-function limitations recited in the following claims, the means are not intended to be limited to the means disclosed herein for performing the recited function, but are intended to cover in scope any means, known now or later developed, for performing the recited function. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Further, as used herein, "plurality" means two or more. As used herein, a "set" of items may include one or more of such items.

Those skilled in the art should appreciate that the parameters and configurations described herein are exemplary and that actual parameters and/or configurations will depend on the specific application in which the systems and techniques of the invention are used. Those skilled in the art should recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

What is claimed is:

1. A water treatment system comprising:
   a contact chamber;
   an input device in fluid communication with water in the contact chamber and configured to measure an operating parameter of the water treatment system and generate a corresponding input signal;
   a controller disposed to receive and analyze the input signal and generate a first output signal, in a first control mode, based on a first difference between the input signal and a first set point value and a second output signal, in a second control mode, based on a second difference between the input signal and a second set point value; and
   an output device configured to introduce an agent into the contact chamber and to receive the first and second output signals and regulate introduction of the agent.

2. The wastewater system of claim 1, wherein the controller can be operated by transferring from a manual control state to an automatic control state.

3. The water treatment system of claim 1, wherein the operating parameter corresponds to an oxidation reduction potential of water in the water treatment system.

4. The water treatment system of claim 3, wherein the controller is configured to calculate a flow adjusted lag time based on a change in a flow rate of the water.

5. The water treatment system of claim 4, wherein the first set point value is 475 mV.

6. The water treatment system of claim 5, wherein any of the first and second output signals is modified based on a water flow measurement and a current dosage value.

7. The water treatment system of claim 6, wherein the second set point value is 700 mV.

8. The water treatment system of claim 7, wherein the controller is configured to modify the any of the first and second output signals based on an oxidation reduction potential set point and the rate of change of the oxidation reduction potential.

* * * * *